Figure 1:
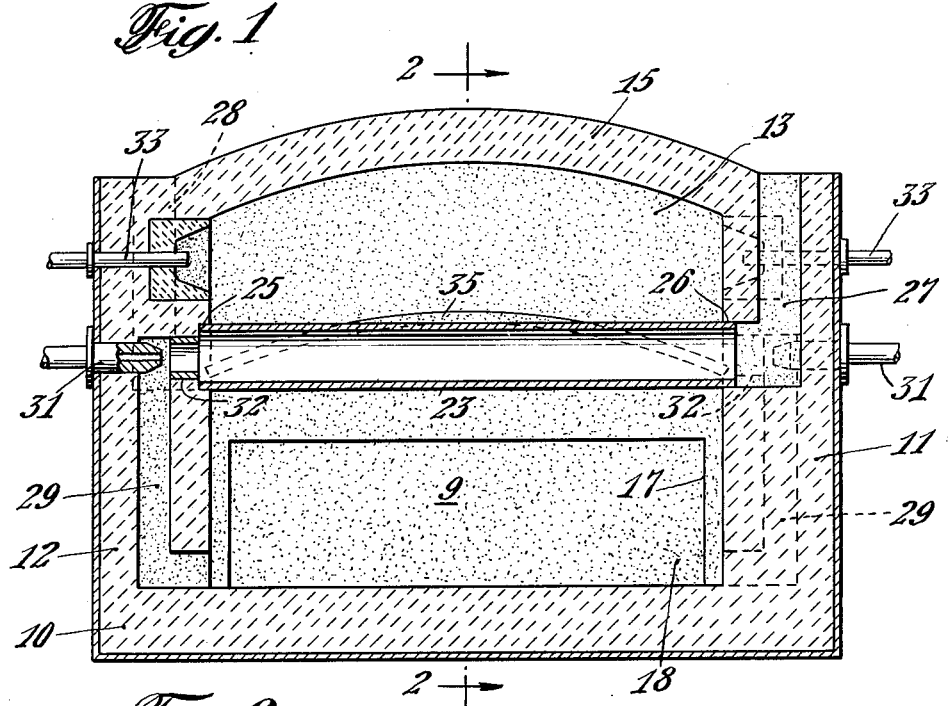

July 16, 1957    F. A. RUSCIANO    2,799,490

TWO STAGE COMBUSTION FURNACE

Filed Dec. 10, 1954

INVENTOR.
F. A. RUSCIANO

BY
M. J. Reynolds
ATTORNEY

United States Patent Office

2,799,490
Patented July 16, 1957

2,799,490

TWO STAGE COMBUSTION FURNACE

Frank A. Rusciano, New York, N. Y., assignor to Metallurgical Processes Co., Newark, N. J., a corporation of New Jersey Application December 10, 1954, Serial No. 474,433

6 Claims. (Cl. 263—40)

This invention relates to a furnace for the production of non-oxidizing atmospheres for industrial furnaces and more particularly to producing such atmospheres by the direct combustion of fuel and air in the work heating chamber.

The invention utilizes the principles set forth in the copending application of H. J. Ness et al. Serial No. 255,774, filed November 10, 1951, now Patent No. 2,763,476, granted September 18, 1956 and entitled "Two Stage Combustion Furnace"; that is a mixture of fuel and air having a deficiency of air of approximately 50% is reacted to substantial completion, whereby all of the carbon of the fuel is combined with the oxygen of the air in the form CO and $CO_2$. The stabilized products of this reaction are utilized as the protective atmosphere in the work heating chamber and as a primary source of heat for the work, the products thereafter being vented from the work heating chamber, mixed with sufficient air to complete the combustion thereof and burned to completion externally of the work heating chamber but in direct conductive and radiant heat relationship to this chamber.

In order to produce the work protective atmosphere from the air deficient air-fuel mixture, it is necessary to supply external heat to the constituents in order to increase the reaction temperature thereof substantially above the normal temperatures of these reactions, since this latter temperature is not sufficient to carry or drive the reactions to completion, with the result that some soot is formed. This soot in addition to being a highly objectionable constituent, reduces the available fuel content of the mixture, thus effectively increasing the air-fuel ratio of the mixture and consequently the $CO_2/CO$ and $H_2O/H_2$ ratios to a point where they no longer represent non-scaling conditions in the furnace. If efforts are made to overcome this difficulty by increasing the fuel content of the mixture still lower reaction temperatures with increased soot formation is obtained.

One of the objects of the present invention is to enable the reaction temperature of the non-scaling air-fuel mixture to be increased sufficiently during the period of reaction thereof to enable all of the carbon of the fuel to be reacted with oxygen and thus to eliminate soot formation.

A further object is to enable these reactions to be completed directly in the work heating chamber.

A still further object is to provide a furnace structure in which the secondary combustion of the protective atmosphere gases will be highly effective to supply heat to the primary reaction products as they are formed and prior to contact thereof with the work being heated.

Other objects are to increase the heating rate of a furnace of the two stage combustion type; to decrease the cost of construction thereof; and to increase the operating efficiency of such a furnace.

In accordance with the present invention I provide a furnace having a work heating chamber supplied with a plurality of burners to which a rich mixture of fuel and air may be applied for combustion directly in the work heating chamber. In order that the products of this combustion shall be non-scaling in character it is essential that the ratio of fuel to air be such as to produce, upon completion of the thermal reactions, resulting products in which the sum of the $CO_2/CO$ and $H_2O/H_2$ ratio is equal to 1.0. With gaseous fuels this unity ratio summation is obtained with approximately 52% of the air that would be required for complete combustion of the fuel. With oil fuels the ratio may be increased up to about 58% depending upon the $C/H_2$ ratio of the fuel. The normal reaction temperature of such mixtures is only of the order of 2100° F. and the heat release only about 20% to 25% of the available B. t. u. content of the fuel when combusted to completion with normal air. As stated, the normal reaction temperature of such mixtures is not sufficient to carry the reactions to completion under normal conditions of firing in industrial furnaces and the heat release is insufficient for effective heating above about 1800° F. In order to make available the remaining heat content of these primary reaction products I provide a series of combustion tubes extending through the work chamber between the aforesaid burners and the work, the protective atmosphere gases being vented from the work chamber, mixed with additional air and burned to completion in the tubes, wherein the remaining 75% to 80% of the heat content of the fuel is released. The primary combustion is thus effected between the combustion tubes and a wall of the furnace in a portion of the chamber away from the work whereby the reaction products receive radiant heat both from the tubes and the hot walls of the furnace and heat by conduction in passing in contact with such hot wall and tubes in transit to the work, the furnace vents being so situated as to draw the combustion products over and through the work. Since the tubes are highly heated, to temperatures of 2600° F. or higher, the primary reactions occur at a high temperature and, therefore, are readily carried to completion and stabilized. The combustion products in addition to being thus energized to facilitate the reactions also serve as an efficient heat transfer medium between the tubes and the work thereby accelerating the work heating rate. Since these primary reactions are stabilized prior to or during their passage between the tubes it is not necessary to provide any extended combustion area above the work thus permitting the tubes to be spaced relatively close to the work. The effective rate of radiations of heat to the work is thus increased to a maximum. Since the primary products forming the protective atmosphere supply through, both primary and secondary combustion, the entire heat requirements for the furnace, the volume of atmosphere passed through the work chamber is relatively large, many times that which could be supplied efficiently to the chamber by the usual commercial forms of external atmosphere generators which do not supply the furnace heat. This large volume of gas in passing over the tubes sufficiently moderates the local heating effect of these tubes on the work to permit the close spacing referred to.

Figure 2:
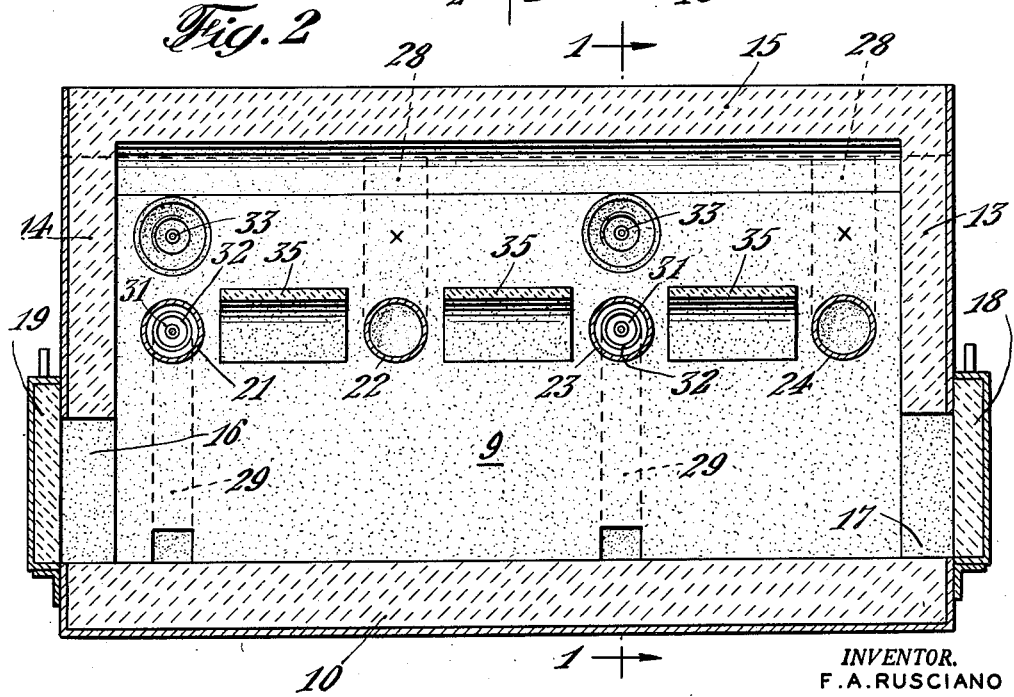

The invention will best be understood by reference to the accompanying drawings in which:

Fig. 1 is a transverse vertical sectional view on the line 1—1 of Fig. 2 of a furnace embodying the principles of the invention; and Fig. 2 is a longitudinal sectional view taken on the line 2—2 of Fig. 1.

The furnace shown may be either of the batch or continuous type and comprises a work heating chamber 9 formed by a floor or hearth 10, vertical side walls 11, and 12, end walls 13 and 14 and an arched roof 15. The end walls 13 and 14 are each provided with a work passage 16 and 17, respectively, normally closed by doors 18 and 19, respectively. A series of tubes 21 to 24 are shown extending horizontally through the chamber 9 slightly above the tops of the door openings 16 and 17. These tubes are shown as straight continuous ceramic or refractory metal members supported in the opposite side walls 11 and 12. This construction is suitable for furnaces in which the span does not permit the stress to exceed the maximum allowance. Where longer spans are required it is preferred to employ an arched tube constructed of interlocking arcuate segments, as shown in my copending application Serial No. 474,462 filed December 10, 1954 and entitled "Apparatus and Method of Producing Protective Combustion Atmospheres." Alternate tubes are arranged to be fired from opposite ends, tubes 21 and 23 having their firing end 25 supported in wall 12 and their discharge end 26 supported in wall 11. Tubes 22 and 24 are fired in the opposite direction. Tubes 21 and 23 at the discharge end open into individual vertical flues 27 and tubes 22 and 24 similarly discharge into vertical flues 28.

A series of vent flues 29 extend from adjacent the floor 10, beneath each tube, upwardly to the firing end 25 of each associated tube, and air jet nozzles 31 project through the side walls 11 and 12 and are directed into the end 25 of the tubes through reduced passageways 32 in such manner as to induce the gases to flow through the vents 29 and to supply the air required for the secondary combustion of these gases.

The primary air-fuel mixture, which has a high deficiency of air, of the order of 50%, is supplied to the work chamber by a series of burners 33 disposed in the side walls 11 and 12 directly above the tubes 21 to 24. The burners 33 are directly over the air jet nozzles 31 whereby opposite burners fire into the chamber from opposite sides and in the direction of firing of the tube which is immediately therebeneath. Since the maximum temperature is produced in the firing end of the tube 24, the burner constituents and partially burned products therefrom contact the tubes 21 to 24 at their hottest point. This has the double effect of (1) quickly heating the primary mixture at the instant it enters the chamber thereby facilitating the cracking down of the fuel and accelerating the reactions, and (2) absorbing heat from the hottest end of the tube whereby to equalize the endwise temperature thereof.

The inner surface of the arched roof 15 becomes highly heated by the tubes and together with the tubes act as high temperature catalysts to promote the primary reactions as the gases are scrubbed thereover. This scrubbing is enhanced by the opposed firing of the burners 33 from opposite sides, whereby a violent agitation of the gases is achieved.

The vents 29, due to their situation at hearth level, draw the reaction products down between the tubes and over the work thereby augmenting the heat transfer from the tubes to the work. This circulation also temporizes any tendency of the tubes to overheat the work due to the close spacing thereof above the hearth.

In the operation of the furnace with a gaseous fuel the amount of heat required to be supplied to the mixture from the tubes to insure completion of the reactions when employing a non-scaling mixture may be readily obtained with the basic furnace structure so far described. However, when richer or endothermic air gas mixtures are employed, as for instance in producing non-decarburizing atmospheres, or in the case of oil-fuel mixtures additional heat absorption by the primary products and catalytic scrubbing of hot refractory may be desired. For such purposes the furnace chamber may be provided with a number of built up thin refractory arched sections 35 extending between adjacent tubes. These sections absorb heat from the tubes and serve as additional hot refractory for contact with the reacting products. They also serve to channel the reaction products more intimately into contact with the tubes and thereby enhance the absorption of heat from the tubes during the passage of the gaseous products to the work. In addition, the arches 35 act as radiant surfaces for heating of the work, thus assisting in maintaining a more uniform heat distribution to work which may be spaced relatively close thereto.

Obviously, numerous modifications of the apparatus will occur to those skilled in the art without departing from the essential attributes of the invention. The present embodiment is therefore, to be considered as merely illustrative of the invention and not restrictive, the scope thereof being indicated by the appended claims rather than the foregoing description, and all changes which come within the meaning and range of equivalents of the claims are intended to be embraced therein.

What I claim is:

1. A furnace for the scale-free heating of metal which comprises a work heating chamber having a hearth for the support of work to be heated, a plurality of burners extending into said work heating chamber, means for supplying a combustible mixture of air and fuel to said burners, said mixture having a large deficiency of air required for complete combustion, a radiant combustion chamber disposed within said work heating chamber and spaced from said hearth, means for supplying a combustible mixture of fuel and air to said combustion chamber for combustion therein and means for venting said heating chamber, said burners and said venting means being positioned in said heating chamber to cause the combustion products from said burners to first pass adjacent to said radiant combustion chamber and thereafter to pass adjacent to said work.

2. A furnace constructed in accordance with claim 1 in which said venting means extends to said combustion chamber to provide the combustible gas supply therefor.

3. A furnace constructed in accordance with claim 1 in which said combustion chamber comprises a plurality of spaced radiant tubes extending across said work heating chamber intermediate said hearth and said burners.

4. A furnace constructed in accordance with claim 3 in which said tubes are spaced above the hearth and said burners are positioned over said tubes.

5. A furnace constructed in accordance with claim 3 having barriers extending between said tubes whereby to direct the burner products into contact with said tubes.

6. A furnace constructed in accordance with claim 5 in which said barriers comprise refractory arches extending across said work heating chamber parallel to said tubes.

References Cited in the file of this patent

UNITED STATES PATENTS

| 1,195,641 | Batchell et al. | Aug. 22, 1915 |
| 2,233,474 | Dreffein | Mar. 4, 1941 |

FOREIGN PATENTS

| 721,549 | Germany | June 9, 1942 |